(12) United States Patent
Grubb

(10) Patent No.: US 11,034,447 B2
(45) Date of Patent: Jun. 15, 2021

(54) UNMANNED AERIAL VEHICLE (UAV) TETHERED WING RECOVERY

(71) Applicant: Insitu, Inc., Bingen, WA (US)

(72) Inventor: Matthew David Grubb, White Salmon, WA (US)

(73) Assignee: Insitu, Inc, Bingen, WA (US)

( * ) Notice: Subject to any disclaimer, the term of this patent is extended or adjusted under 35 U.S.C. 154(b) by 302 days.

(21) Appl. No.: 16/119,021

(22) Filed: Aug. 31, 2018

(65) Prior Publication Data
US 2020/0070973 A1 Mar. 5, 2020

(51) Int. Cl.
*B64C 25/68* (2006.01)
*B64C 3/38* (2006.01)
*B64C 39/02* (2006.01)

(52) U.S. Cl.
CPC .............. *B64C 39/024* (2013.01); *B64C 3/38* (2013.01); *B64C 25/68* (2013.01); *B64C 2201/021* (2013.01); *B64C 2201/104* (2013.01); *B64C 2201/182* (2013.01)

(58) Field of Classification Search
CPC ........... B64C 3/38; B64C 25/68; B64C 37/02; B64C 2201/102; B64C 2201/104; B64C 2201/182; B64F 1/02; B64F 1/029; B64D 3/00; B64D 5/00
See application file for complete search history.

(56) References Cited

U.S. PATENT DOCUMENTS

| | | | | |
|---|---|---|---|---|
| 1,424,996 A * | 8/1922 | Dunlap | ................... | B64C 3/38 244/213 |
| 2,572,421 A * | 10/1951 | Abel, Jr. | ................... | B64C 3/56 244/49 |
| 2,809,792 A * | 10/1957 | Hohmann | ................. | B64F 1/08 244/3 |
| 2,969,933 A * | 1/1961 | Vogt | ........................ | B64C 37/02 244/2 |
| 3,013,743 A * | 12/1961 | Keeney | ................... | B64D 5/00 244/3 |
| 3,161,373 A * | 12/1964 | Vogt | ........................ | B64D 5/00 244/2 |
| 3,226,056 A * | 12/1965 | Holland, Jr. | ............ | B64C 37/02 244/2 |
| 3,249,322 A * | 5/1966 | Holland, Jr. | ............. | B64D 5/00 244/3 |
| 6,260,798 B1 * | 7/2001 | Casiez | .................. | B64C 39/024 244/49 |
| 6,264,140 B1 * | 7/2001 | McGeer | .................. | B64C 25/68 244/110 C |
| 8,061,646 B2 * | 11/2011 | Gomez | ................. | B64C 23/076 244/2 |
| 8,136,766 B2 * | 3/2012 | Dennis | .................. | F16B 41/002 244/199.4 |
| 9,896,187 B2 * | 2/2018 | Thompson | ................ | B64C 3/38 |

(Continued)

*Primary Examiner* — Joseph W Sanderson
(74) *Attorney, Agent, or Firm* — Hanley, Flight & Zimmerman, LLC

(57) ABSTRACT

Unmanned aerial vehicle (UAV) tethered wing recovery is disclosed. An example apparatus includes a detachable portion of a wing that is couplable to a fixed portion of the wing, a lock configured to fasten the detachable portion to the fixed portion, where the lock is to disengage the detachable portion from the fixed portion upon contact of the wing with a recovery device, and a tether configured to extend between the detachable and fixed portions.

20 Claims, 10 Drawing Sheets

(56) References Cited

U.S. PATENT DOCUMENTS

| | | | |
|---|---|---|---|
| 10,518,902 B2* | 12/2019 | Briggs | B64F 1/02 |
| 10,661,882 B2* | 5/2020 | Haley | A63H 27/001 |
| 10,767,682 B2* | 9/2020 | Leon | B64C 23/069 |
| 2009/0127376 A1* | 5/2009 | Gomez | B64C 39/024 |
| | | | 244/2 |
| 2009/0194638 A1* | 8/2009 | Dennis | B64C 23/069 |
| | | | 244/131 |
| 2009/0314886 A1* | 12/2009 | Clancy | B64C 39/024 |
| | | | 244/1 TD |
| 2016/0272298 A1* | 9/2016 | Thompson | B64C 3/56 |
| 2017/0253319 A1* | 9/2017 | Vance | B64D 41/00 |
| 2018/0001990 A1 | 1/2018 | Kossar et al. | |
| 2018/0057136 A1* | 3/2018 | Haley | A63H 27/001 |
| 2018/0086481 A1* | 3/2018 | Briggs | B64F 1/02 |
| 2019/0003511 A1* | 1/2019 | Leon | F16B 31/021 |
| 2019/0084664 A1* | 3/2019 | Nesti | B64C 23/069 |
| 2019/0168872 A1* | 6/2019 | Grubb | B64C 9/16 |
| 2020/0130810 A1* | 4/2020 | Elson | B64D 9/00 |

\* cited by examiner

UNMANNED AERIAL VEHICLE (UAV) TETHERED WING RECOVERY

FIELD OF THE DISCLOSURE

This disclosure relates generally to aircraft and, more particularly, to unmanned aerial vehicle (UAV) tethered wing recovery.

BACKGROUND

In recent years, unmanned aerial vehicles (UAVs) or drones have been used to fly significant distances to transport payloads (e.g., packages, supplies, equipment, etc.) or gather information. Some UAVs land on runways while others are captured in flight by UAV recovery systems. Such recovery systems enable a UAV to not carry a landing gear system or landing components. However, the recovery systems can subject a UAV to significant loads during a recovery process due to sudden deceleration of the UAV during an impact with recovery devices. Such significant loads can cause damage to the UAV or necessitate strengthening components or features, thereby potentially increasing cost and weight of the UAV.

Figure 1:
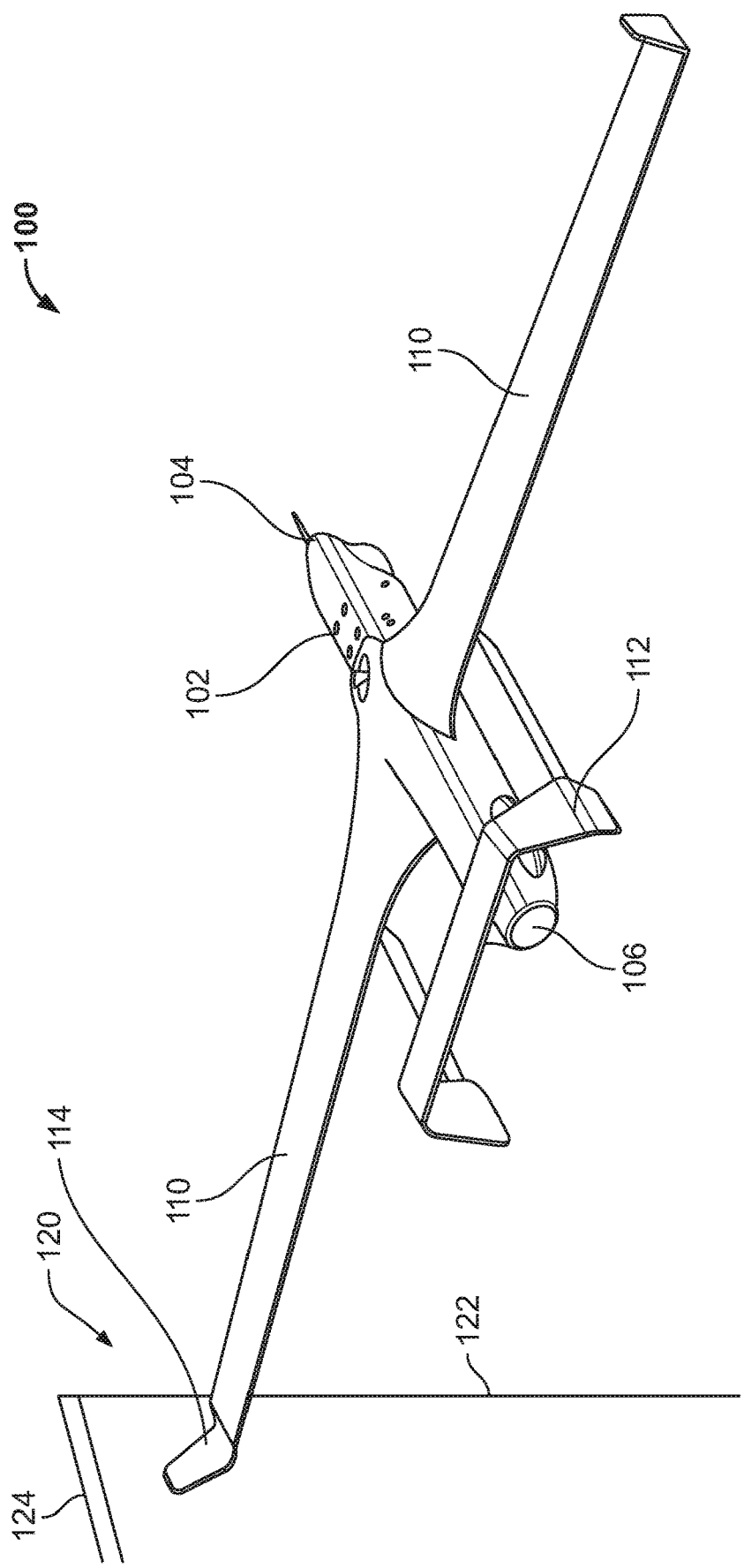
FIG. 1 illustrates an example unmanned aerial vehicle (UAV) in which examples disclosed herein can be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Unmanned aerial vehicle (UAV) tethered wing recovery is disclosed. Some known UAV recovery systems can subject a UAV to relatively high loads during impact of the UAV with a UAV recovery system. In particular, the UAV can undergo significant impact forces when the wing of the UAV impacts a net or pole of the UAV recovery system. To avoid potential damage to the UAV from such an impact, some known UAVs implement structural reinforcements, which can add significant weight, cost and/or complexity to the UAV.

Examples disclosed herein provide effective impact force dissipation during recovery of an aircraft (e.g., a UAV). In particular, examples disclosed herein enable a detachable portion of a wing to be separated from a fixed portion of the wing when the UAV is being recovered, thereby relieving impact forces that would otherwise potentially damage the UAV. Examples disclosed herein implement a lock to enable the detachable portion of the wing to disengage from the fixed portion upon contact of the wing with a recovery device. Further, a tether extends between the detachable and fixed portions, thereby enabling additional impact force dissipation. Examples disclosed herein enable weight, cost and volume savings for aircraft that land with recovery systems by reducing (e.g., eliminating) a need for reinforcing materials, structures and/or components that would otherwise be needed for recovery.

In some examples, the tether is at least partially composed of an elastic cable and/or fiber that can stretch or elongate to dissipate impact energy of an aircraft. In some examples, the tether is disposed within a guide that aligns fixed and detachable portions of a wing relative to another. In some such examples, the tether is coiled within the guide when the fixed and detachable portions are coupled thereto. In some examples, the guide includes a generally trapezoidal shape. In some examples, the lock includes a frangible element, such as a shear pin, for example. The shear pin can be disposed in a barrel nut to break upon impact of a wing with a recovery device. In other examples, the lock includes a spring (e.g., a canted coil spring, a ring spring, a toroidal spring, etc.) that is to be received by a curved annular surface of a shaft such that the spring disengages from the curved annular surface when a wing impacts a recovery device.

As used herein, the term "fixed portion" refers to a portion of a wing that remains attached to a fuselage or body of an aircraft. Accordingly, the term "detachable portion" refers to a portion of a wing that separates from the fixed portion. As used herein, the term "lock" refers to an assembly and/or component that is used to couple (e.g., releasably couple) two components together. As used herein, the term "frangible" refers to a consumable component and/or assembly that can be broken or damaged for intended later replacement. As used herein, the term "guide" refers to a component used for relative alignment of components when the components are coupled together and/or moved towards one another.

FIG. 1 illustrates an example unmanned aerial vehicle (UAV) 100 in which examples disclosed herein can be implemented. The example UAV 100 includes a fuselage 102 with a guidance portion 104, a propulsion system 106, wings 110, a tail (e.g., a tail section) 112 and a hook (e.g., a distal end recovery hook, a distal hook) 114. As can be seen in FIG. 1, the UAV 100 is being recovered by a recovery system 120, which includes a recovery line (e.g., a recovery tether, a recovery net, etc.) 122 and a corresponding support structure 124.

To recover the UAV 100 while the UAV 100 is in flight, the UAV 100 is flown within range of the recovery line 122 to bring one of the wings 110 (e.g., a distal end of one of the wings 110) toward the recovery line 122. As a result of a portion along a span of the wing 110 contacting the recovery line 122, the hook 114 engages the recovery line 122, thereby causing the UAV 100 to decelerate. This deceleration of the UAV 100 can result in significant force(s) applied to the fuselage 102 and the wing 110. In particular, the engagement of the hook 114 to the recovery line 122 can cause the UAV 100 to spin laterally, thereby potentially damaging a joint or interface between the wing 110 and the fuselage 102.

Examples disclosed herein enable the wing 110 to be separated from the UAV 100 while allowing the wing 110 to be loaded along a direction such that the wing can withstand high impact forces from an impact of the UAV 100 with the recovery line 122. For example, a long slender wing (e.g., a high aspect ratio wing) can have reduced strength in bending when loaded in a direction to cause tension along a length of the wing. As a result, structural reinforcements, such as structural components or bracing, are not necessitated, thereby saving weight and cost of the UAV 100.

Figure 2:
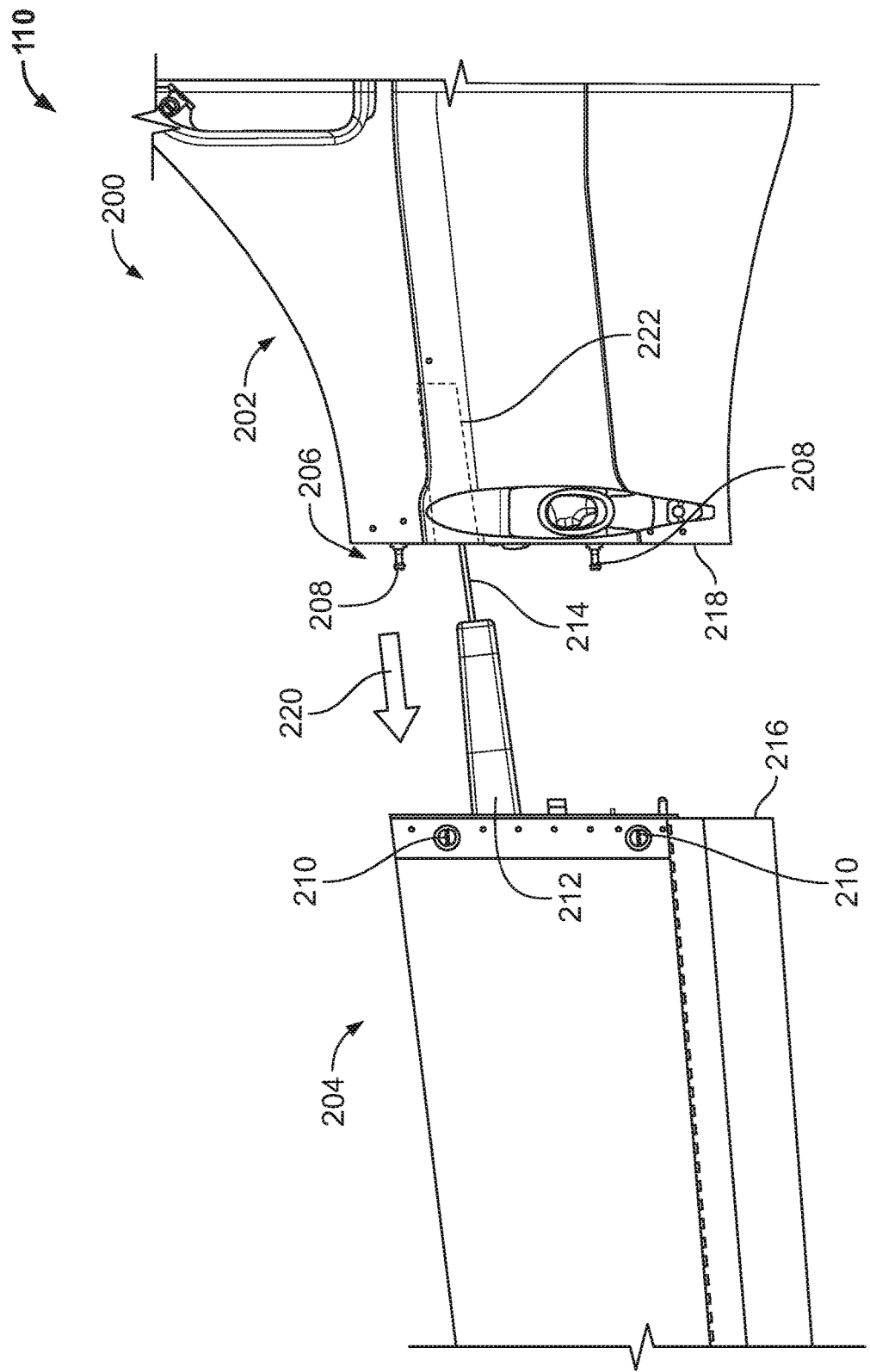
FIG. 2 is a top view of an example detachable wing section in accordance with teachings of this disclosure.

FIG. 2 is a top view of an example detachable wing section 200 in accordance with teachings of this disclosure. The example detachable wing section 200 is implemented in the wing 110 and includes a fixed portion 202, a detachable portion 204, and a lock (e.g., a lock system, a coupling system, a lock assembly, etc. etc.) 206 having arm locks (e.g., barrel nut bore locks, arm lock bores, locking collars, release collars, etc.) 208 and receptacle locks (e.g., locking receptacles, locking nuts, cam locks, cam lock bores, etc.) 210. In some examples, the detachable wing section 200 includes a guide (e.g., a spar joiner, structural joint, etc.) 212. In this example, the detachable wing section 200 also includes a tether 214.

In operation, an edge 216 of the detachable portion 204 is separated from an edge 218 of the fixed portion 202 along a direction generally indicated by an arrow 220 when the detachable portion 204 and/or the wing 110 impacts a recovery device, such as the recovery line 122 shown in FIG. 1. In particular, the impact of the recovery line 122 with the detachable portion 204 causes the recovery line 122 to slide along a front edge of the wing 110. In turn, the arm locks 208 are loaded in a new direction not seen during flight and separate from the corresponding receptacle locks 210. This separation of the arm locks 208 from the corresponding receptacle locks 210 can dissipate a portion of the impact energy encountered during the impact. As will be discussed in greater detail below with FIGS. 5-6B, the lock assembly 206 can be implemented with frangible components (e.g., inexpensive frangible components) that are replaced after being damaged (e.g., failing) subsequent to the impact. In other examples, the arm locks 208 separate from the receptacle locks 210 without component breakage, as will be discussed in greater detail below in connection with FIGS. 7A and 7B.

According to the illustrated example, the guide 212 exhibits a generally trapezoidal or tapered shape (e.g., a tapered trapezoidal shape, a prismatic shape, etc.) and is used to guide a relative alignment of the detachable portion 204 to the fixed portion 202 when coupled thereto. In this example, the guide 212 is received (e.g., matably received) by an aperture (e.g., an opening, a cavity, etc.) 222 of the fixed portion 202. In particular, the aperture 222 has a complementary trapezoidal shape to receive the guide 212. The example guide 212 carries wing bending loads during flight, but enable separation of the detachable portion 204 from the fixed portion 202 when the lock(s) 206 are released and/or frangibly detached. Further, the example tether 214 couples the detachable portion 204 to the fixed portion 202 and extends from within the guide 212.

In some examples, the tether 214 is implemented as an elastic line (e.g., an elastic rope, an elastic cable, etc.). In such examples, the tether 214 dissipates separation energy as it is stretched after separation of the detachable portion 204 from the fixed portion 202. Additionally or alternatively, the tether 214 is at least partially composed of polyester, nylon, and/or a high toughness nylon rope. While the arm locks 208 are mounted to the fixed portion 202 in this example, the arm locks 208 can instead be mounted to the detachable portion 204 while the receptacle locks 210 are disposed in the fixed portion 202. In some other examples, the detachable portion 204 is instead directly coupled to the fuselage 102 (shown in FIG. 1). In such examples, the entire wing 110 is detached from the fuselage 102 upon impact of the wing 110 with the recovery line 122. In some examples, the guide 212 acts a load-bearing structural member of the wing 110 by carrying loads (e.g., flight loads, cruise loads, take off loads, landing loads, etc.) from the fixed portion 202 to the detachable portion 204 and vice-versa.

Figure 3A:
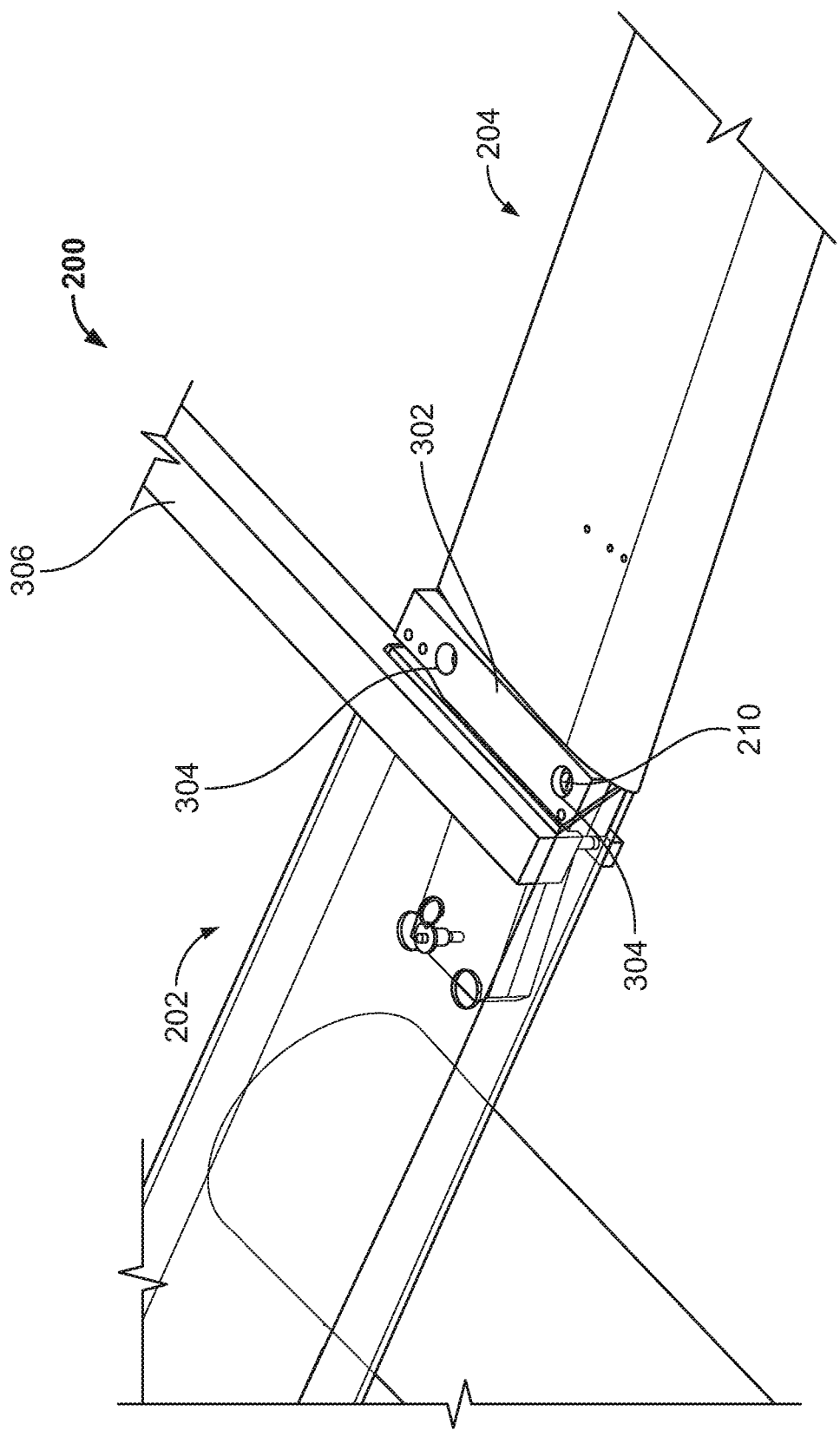
FIGS. 3A and 3B depict the example detachable wing section of FIG. 2 shown in exterior and cutaway views, respectively, while in a coupled state.
Figure 3B:
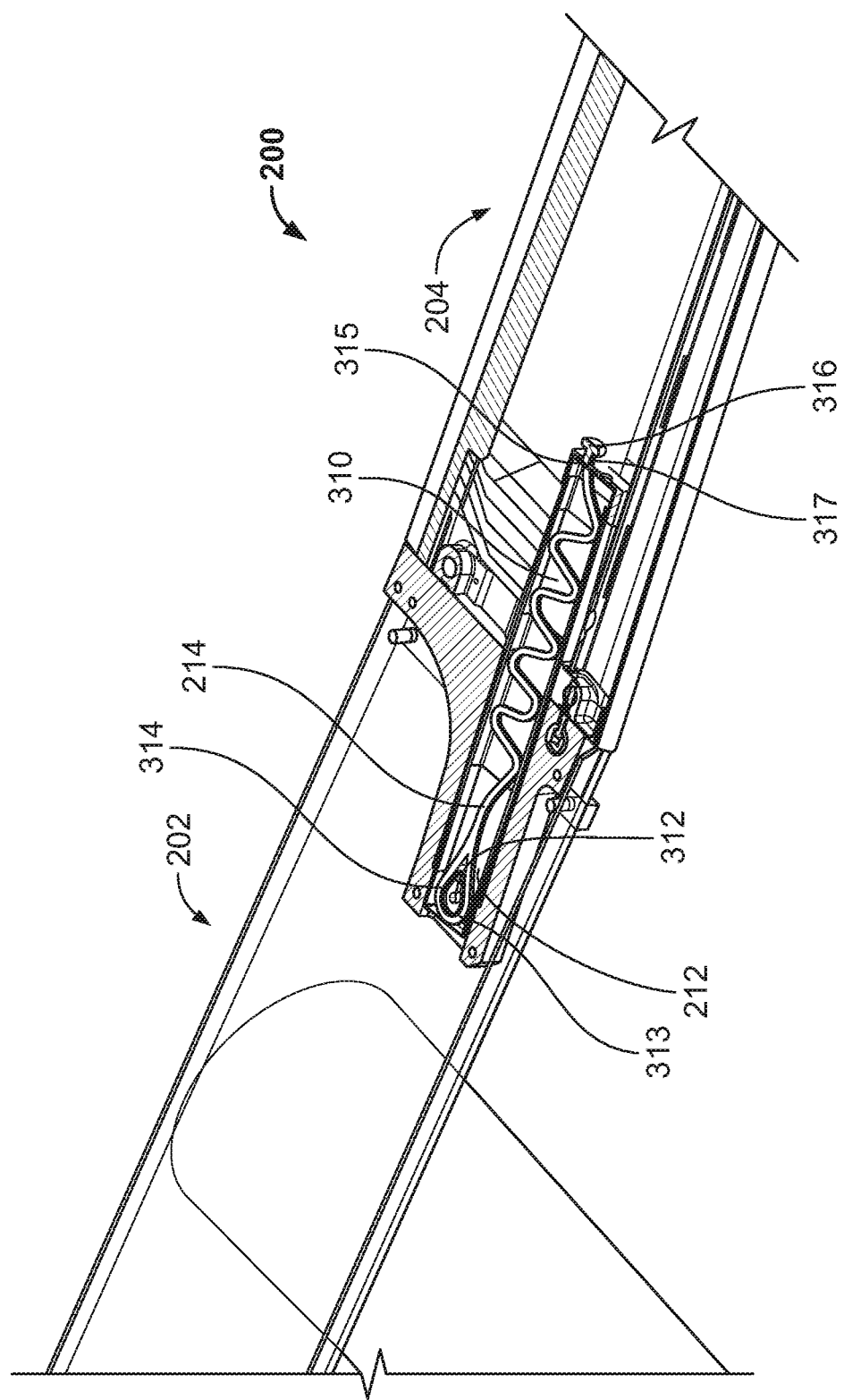

FIGS. 3A and 3B depict the example detachable wing section 200 of FIG. 2 shown in exterior and cutaway views, respectively, while the detachable wing section 200 is in a coupled state. In this particular example, the receptacle locks 210 are disposed on the fixed portion 202. Further, the fixed portion 202 exhibit a rectangular cross-section, and could be implemented as any aerodynamic profile, as shown in FIGS. 1 and 2. Turning to FIG. 3A, the detachable portion 204 is coupled to and aligned with the fixed portion 202. In particular, a collar (e.g., a shoulder, a joint, a joint housing, etc.) 302, which includes openings 304, couples and aligns the detachable portion 204 to the fixed portion 202. Further, the coupling portion 302 mounts a boom 306 that extends to the tail section 112 of FIG. 1.

To fasten and/or lock the detachable portion 204 to the fixed portion 202, the receptacle lock 210 (shown in FIG. 2) is accessed via the openings 304. In particular, the example receptacle lock 210 is rotated via a tool to constrain, align and/or operatively couple the receptacle lock 210 relative to the arm lock 208. In some examples, a frangible component is assembled to or within the lock 206 so that the easily-replaceable frangible component breaks during impact of the wing 110 with the recovery line 122.

Turning to FIG. 3B, a cutaway view is shown of the detachable wing section 200 with the detachable portion 204 coupled to the fixed portion 202. According to the illustrated example of FIG. 3B, the guide 212 includes an internal volume (e.g., a chamber, a recess, a cavity, etc.) 310 extending along a longitudinal length of the guide 212. Accordingly, the tether 214 is coiled and/or folded within the volume 310. In particular, the example guide 212 includes a post 312, which a loop 314 of the tether 214 wraps around at a first end 313 of the tether 214. To facilitate a fit of the loop 314 over the post 312, the loop 314 exhibits a generally oblong or teardrop shape. However, any appropriate shapes and/or mating structures can be implemented instead. At a second end 317 of the tether 214 opposite the aforementioned first end 313, an opening 315 of the guide 212 positions a plug (e.g., a captivating plug or bulb) 316 of the tether 214. Alternatively, the termination of the plug 316 can be extended further down the length of the wing to allow for additional energy absorption with the plug 316 or an alternative anchor disposed in the detachable portion 204.

Figure 4A:
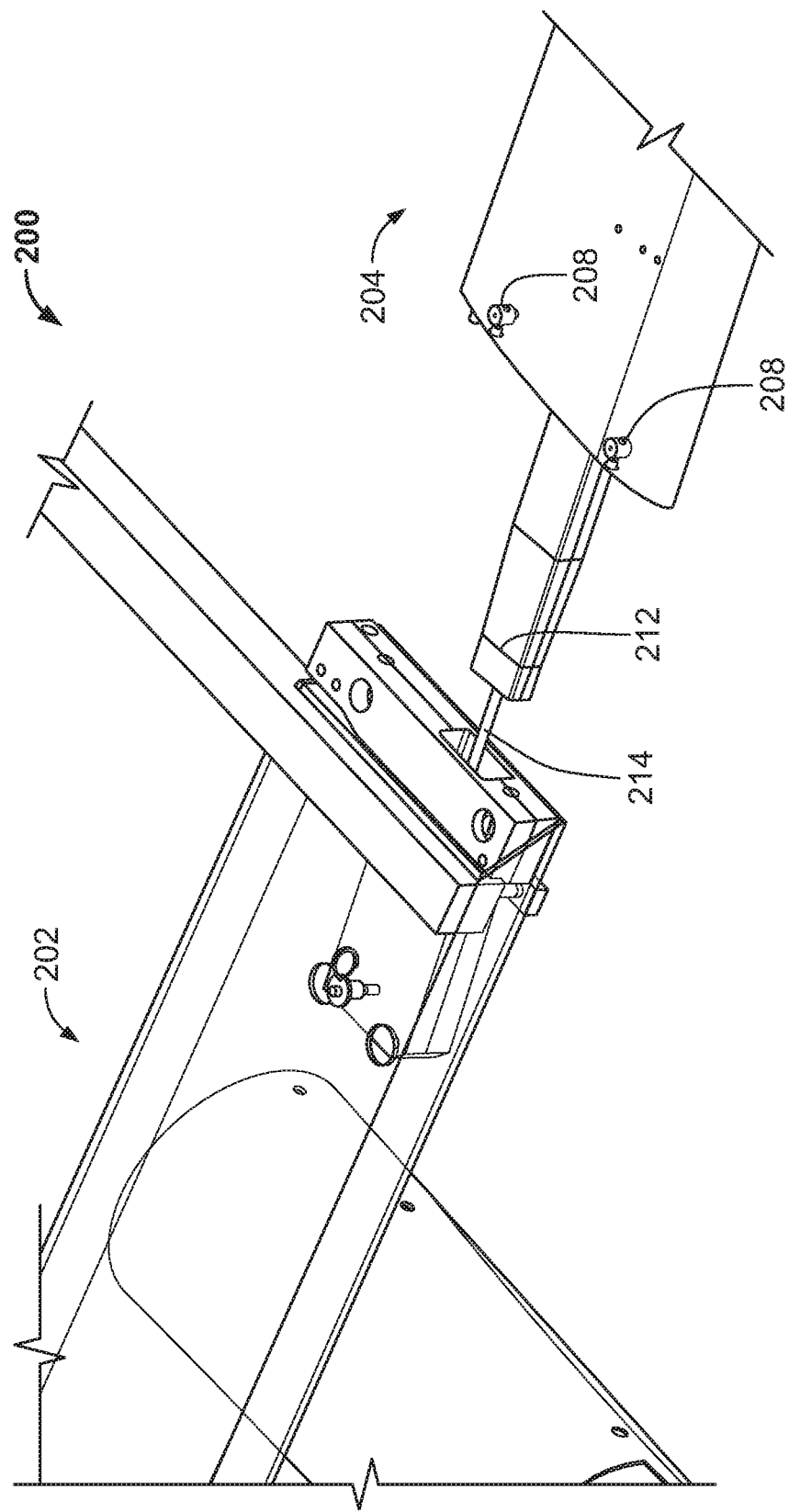
FIGS. 4A and 4B depict the example detachable wing section of FIG. 2 shown in exterior and cutaway views, respectively, while in a de-coupled state.
Figure 4B:
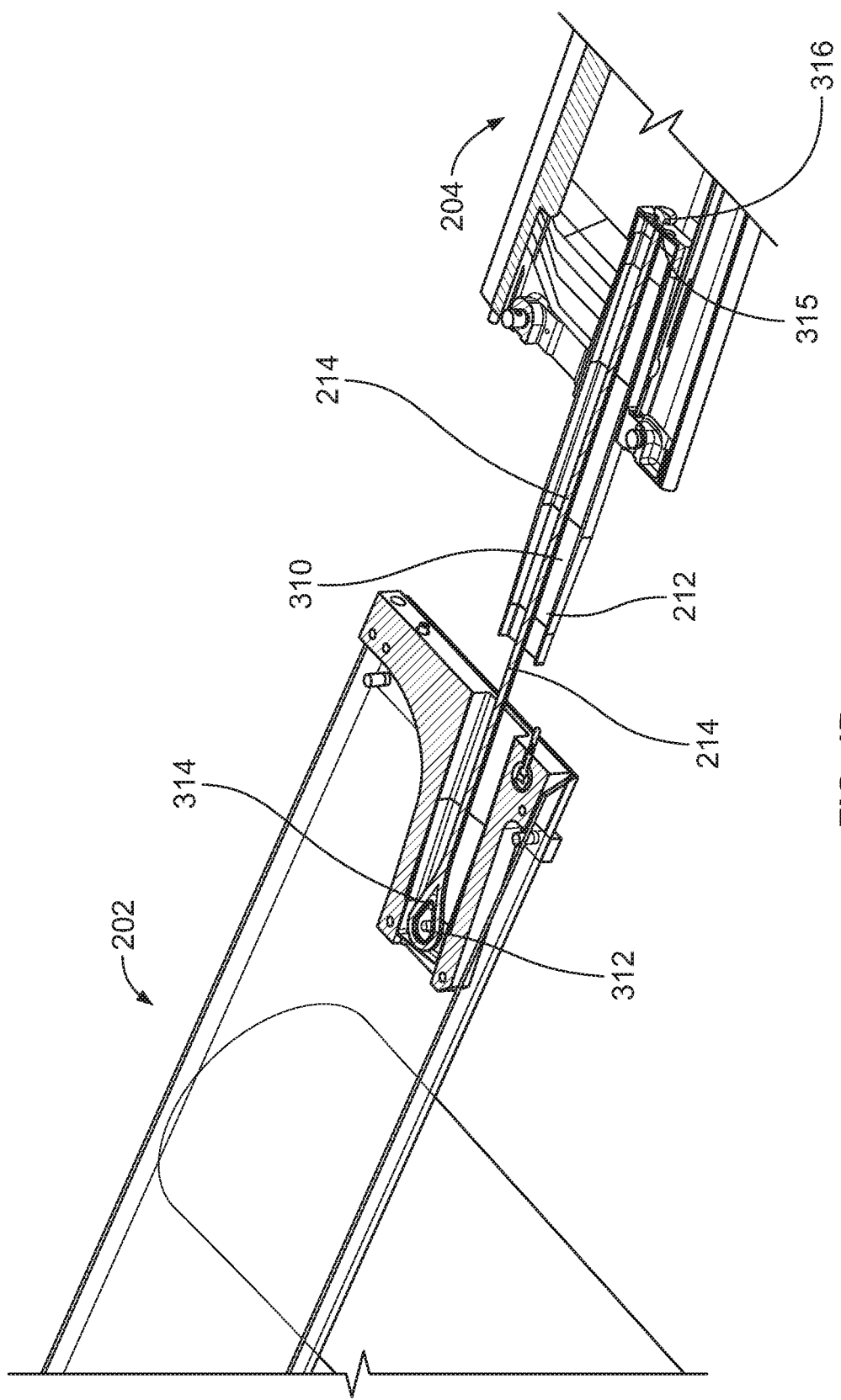

FIGS. 4A and 4B depict the example detachable wing section 200 of FIG. 2 shown in exterior and cutaway views, respectively, while in a detached state. Turning to FIG. 4A, the detachable portion 204 is shown separated from the fixed portion 202. In particular, the tether 214 extends out of the guide 212. Further, the arm locks 208 have remained coupled to the detachable portion 204 in this example.

FIG. 4B is similar to the view of FIG. 4A, but shown as a cutaway view. According to the illustrated example, the tether 214 is shown fully extended out of the internal volume 310 of the guide 212. In particular, the tether 214 is stretched by an engagement of the loop 314 with the post 312, as well as an engagement of the plug 316 with the opening 315 when the detachable portion 204 separates from the fixed portion 202, subsequent to an impact of the detachable portion 204 with the recovery line 122.

Figure 5A:
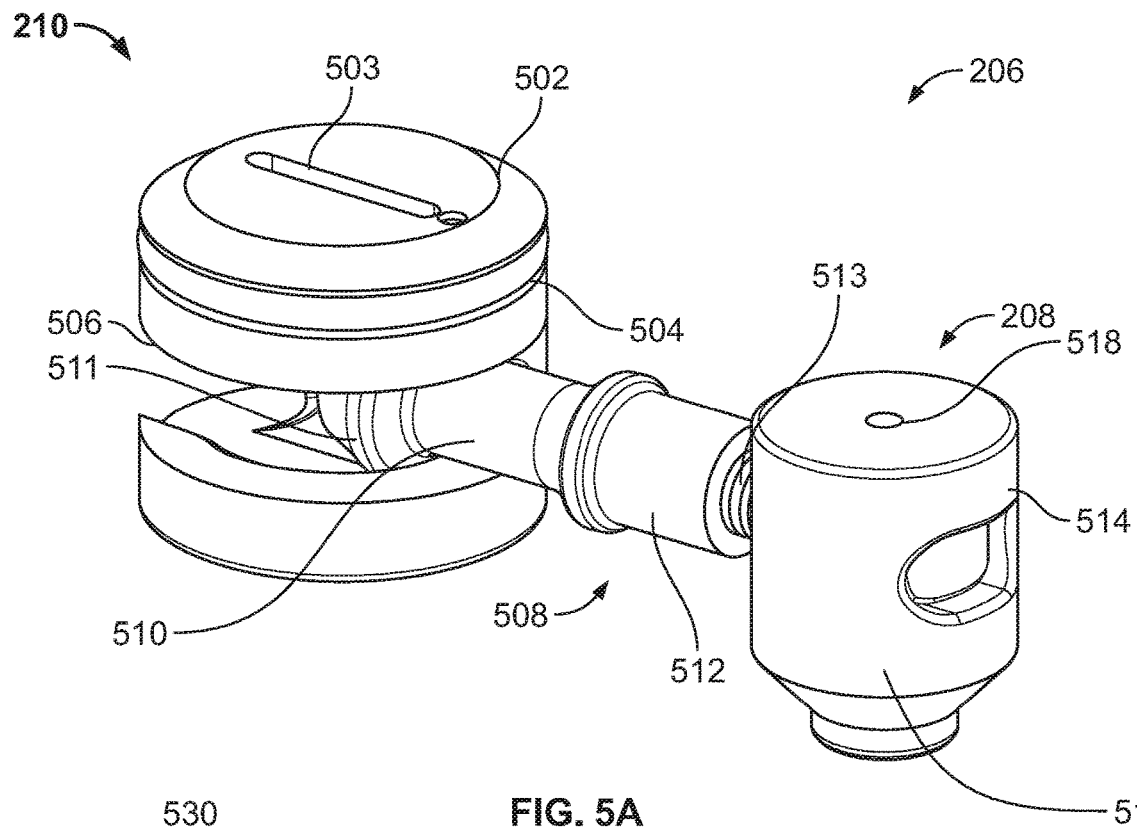
FIGS. 5A and 5B are detailed perspective views of an example lock that can be implemented in examples disclosed herein.
Figure 5B:
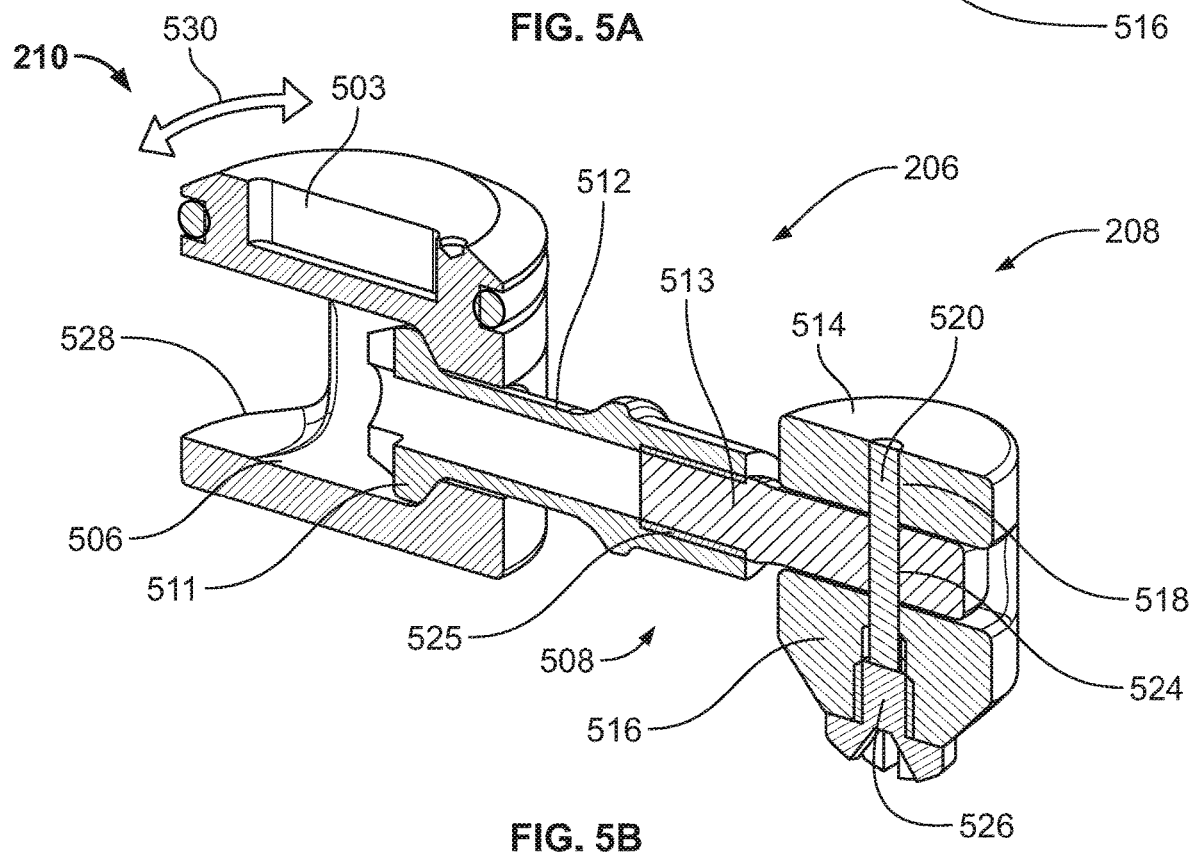

FIGS. 5A and 5B are detailed perspective views of the example lock 206. Turning to FIG. 5A, the lock 206 of the illustrated example includes the receptacle lock 210, which includes a cylindrical body 502, a tool interface or slot 503, an annular groove 504 and a slotted opening (e.g., a contoured opening) 506. The lock 206 also includes an arm (e.g., a swivel arm, a locking arm, a stem, etc.) 508, which includes the cam shaft portion 510 with a distal enlarged portion 511, and an interfacing portion (e.g., an interface shaft, an interface collar, a shaft receptacle, etc.) 512 having an interfacing shaft 513 coupled thereto. Further, the example lock 206 also includes the arm lock 208 with a barrel nut 514 having a cylindrical body 516. In this example, the cylindrical body 516 includes a bore 518 longitudinally extending therethrough.

Turning to FIG. 5B, which depicts the lock 206 in a cross-sectional view, a locking pin (e.g., a shear pin, a breakable pin, a frangible pin, etc.) 520 extends through both the bore 518 of the cylindrical body 516 and an aperture 524 of the interfacing shaft 513, thereby constraining the arm lock 208 to the arm 508. Further, the interfacing shaft 513 is threadably coupled to the interfacing portion 512 via a threaded interface 525. In some examples, the locking pin 520 includes a restraining screw 526 to restrain the locking pin 520.

To separate or couple the arm 508 from/to the receptacle lock 210, a tool is inserted into the slot 503, and an enlarged section 528 of the slotted opening 506 is rotated along a direction generally indicated by a double arrow 530. As a result, the arm 508 can be separated from the receptacle lock 210 because the enlarged section 528 of the slotted opening 506 faces an orientation at which the enlarged portion 511 of the arm 508 can be removed therefrom.

To enable the arm lock 208 to separate from the arm 508 during an impact of the wing 110 and/or the hook 114 with the recovery line 122, movement and/or displacement of the barrel nut 514 relative to the arm 508 causes the locking pin 520 to shear and, in turn, break or fracture in some examples. As a result, the guide 212 separated from the fixed wing section, thereby relieving the wing 110 from encountering significant bending forces that can potentially result in structural damage.

As mentioned above, the interfacing shaft 513 is threaded to the interfacing portion 512 via the threaded interface 525. However, any appropriate attachment method can be implemented instead including, but not limited to, a mechanical fastener, an interfacing fit (e.g., a dovetail design), a snap, a magnet, a chemical fastener, etc. In some examples, the barrel nut 514 is at least partially composed of aluminum or titanium.

Figure 6:
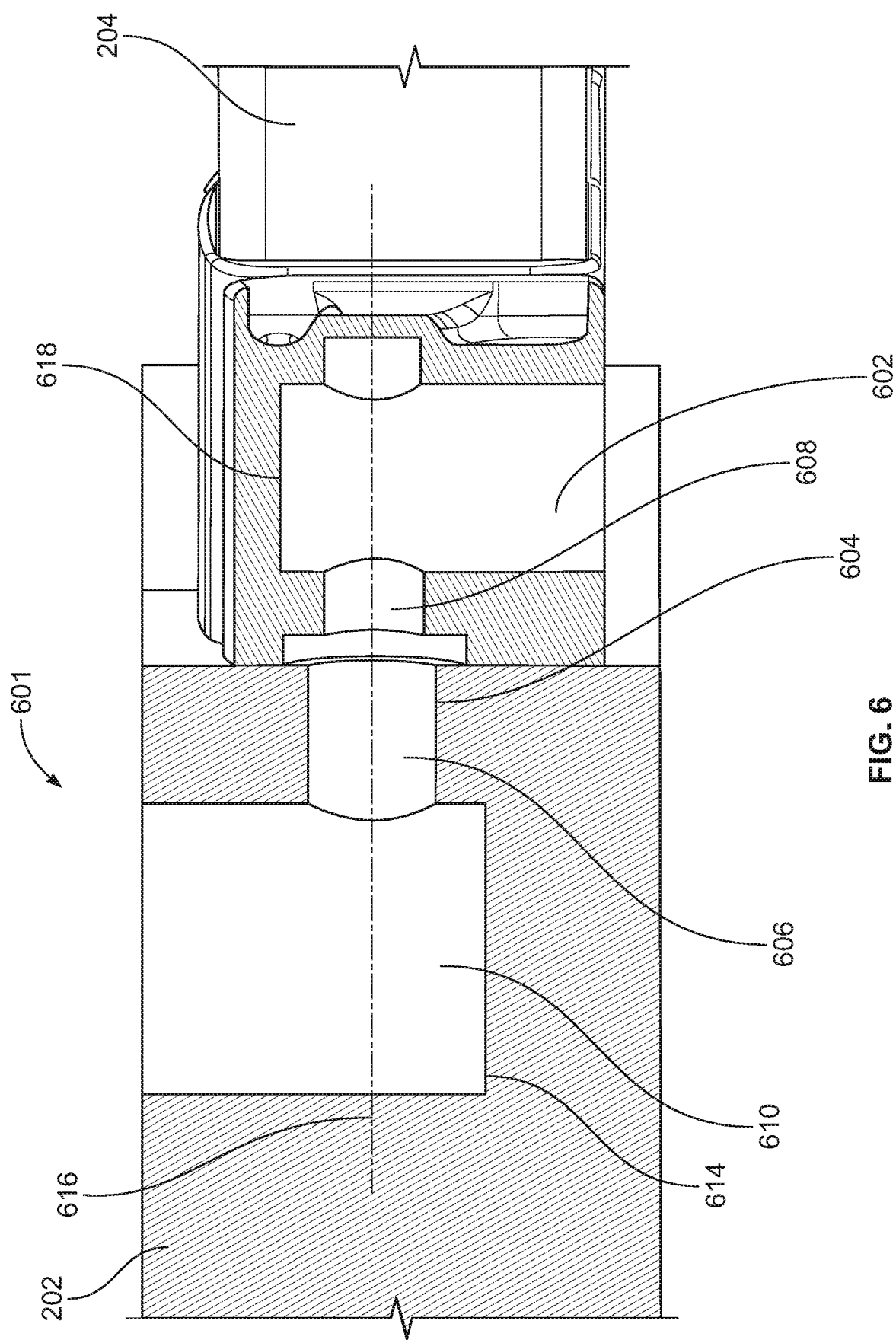
FIG. 6 is a detailed cross-sectional view of an example lock cavity that may be implemented in examples disclosed herein.

FIG. 6 is a detailed cross-sectional view of an example cavity and/or cavity system 601 to align and constrain the lock 206 of FIG. 2. The cavity 601 of the illustrated example includes an arm lock cavity 602 to captivate the arm lock 208, and an arm cavity 604 to captivate the arm 508. Further, the example arm cavity 604 includes cylindrical openings 606, 608. According to the example of FIG. 5, the cavity 601 includes a cylindrical opening 610 to capture the receptacle lock 210.

According to the illustrated example, the cylindrical opening 610 has an approximate diameter of 0.740 to 0.800 inches (e.g., 0.770 inches). Further, the cylindrical opening 606 is approximately 0.323 to 0.365 inches (e.g., 0.344 inches) in diameter while the cylindrical opening 608 is approximately 0.244 to 0.288 inches (e.g., 0.266 inches) in diameter. Additionally, the example arm lock cavity 602 has a diameter of 0.480 inches to 0.520 inches (e.g., 0.500 inches). In this example, a bottom surface 614 of the cylindrical opening 610 is approximately 0.286 inches to 0.306 inches (e.g., 0.296 inches) from a corresponding centerline 616 that extends through the arm cavity 604. A top surface 618 of the arm lock cavity 602 is approximately 0.240 inches to 0.260 inches (e.g., 0.250 inches) from the centerline 616 in this example. The aforementioned dimensions are only examples and any appropriate dimensions and/or spacing can be implemented instead.

Figure 7A:
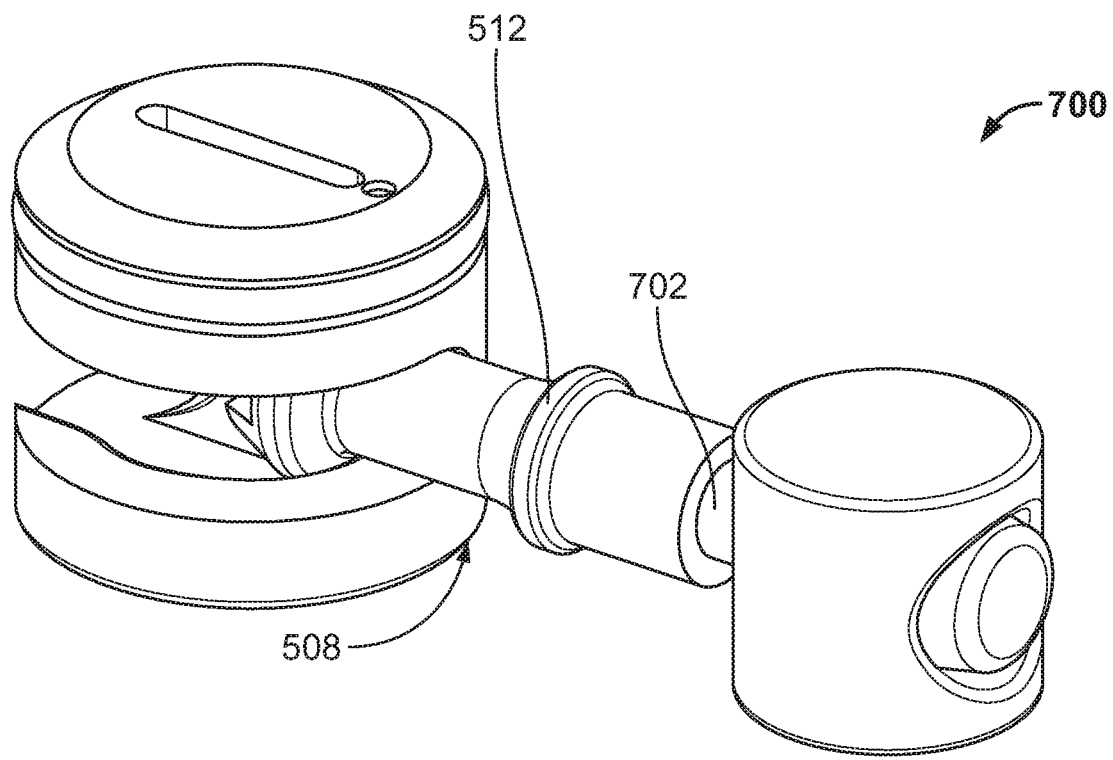
FIGS. 7A and 7B are detailed perspective views of an alternative example lock that may be implemented in examples disclosed herein.
Figure 7B:
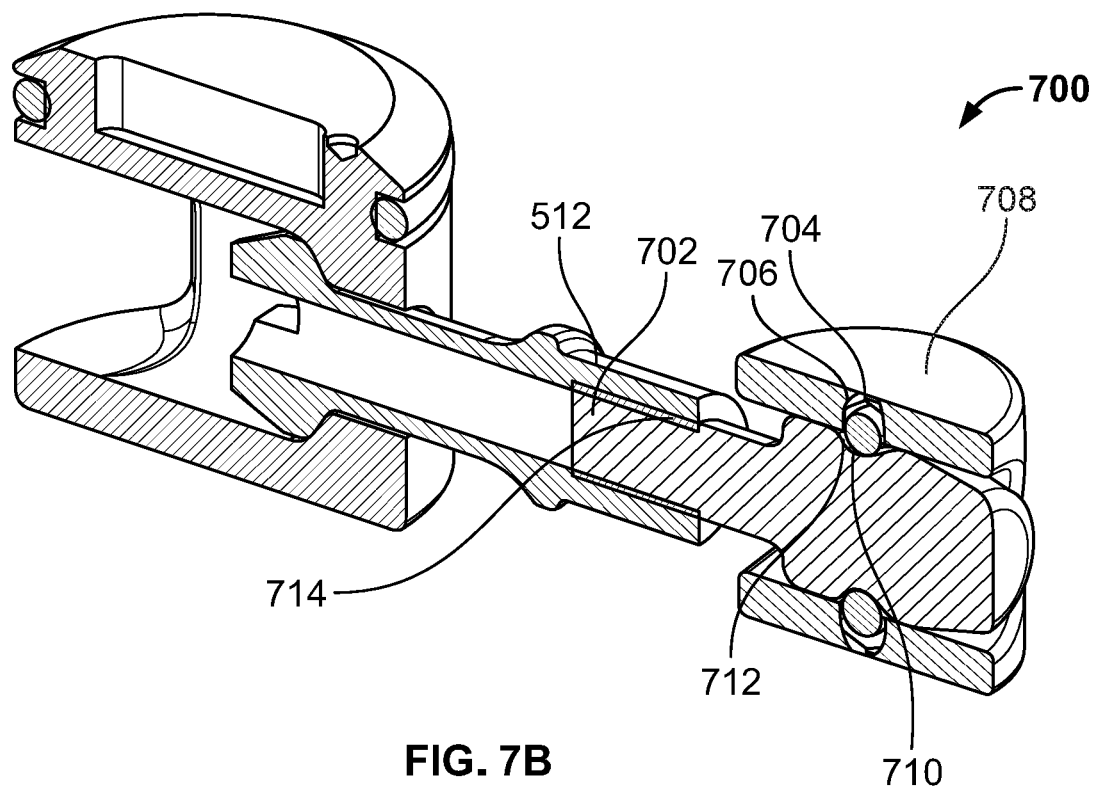

FIGS. 7A and 7B are detailed perspective views of an alternative example lock 700 that may be implemented in examples disclosed herein. Turning to FIG. 7A, the lock 700 is similar to the example lock 206 shown and described in connection with FIGS. 2-6B. However, in contrast to the lock 206, the lock 700 of the illustrated example includes an interfacing shaft 702 that is coupled to the interfacing portion 512 of the arm 508.

Turning to FIG. 7B, a cross-sectional view of the example lock 700 is shown. According to the illustrated example, the lock 700 includes a spring (e.g., a canted coil spring, a ring spring, a toroidal spring) 704 that is at least partially captivated in an opening or groove 706 of a barrel nut 708. Further, the interfacing shaft 702 includes a recess (e.g., an annular recess) 710 to receive the spring 704. In this particular example, the spring 704 is implemented as a canted coil spring that is received by a contoured surface (e.g., a curved annular surface) 712 of the recess 710. However, any other appropriate spring type can be implemented instead. Further, the interfacing shaft 702 of the illustrated example is coupled to the interface portion 512 via a threaded interface 714.

In operation, an impact of the wing 110 and/or the hook 114 with the recovery line 122 causes the barrel nut 708 to displace relative to the interfacing shaft 702 and, in turn, the spring 704 disengages from the recess 710. In particular, the contoured surface 712 of the recess 710 facilitates removal and/or movement of the spring 704 from the interfacing shaft 702 during the impact without translating significant forces to the wing 110. As a result, the spring 704 encounters little or no significant damage and can be subsequently reused for recovery of the UAV 100.

Figure 8:
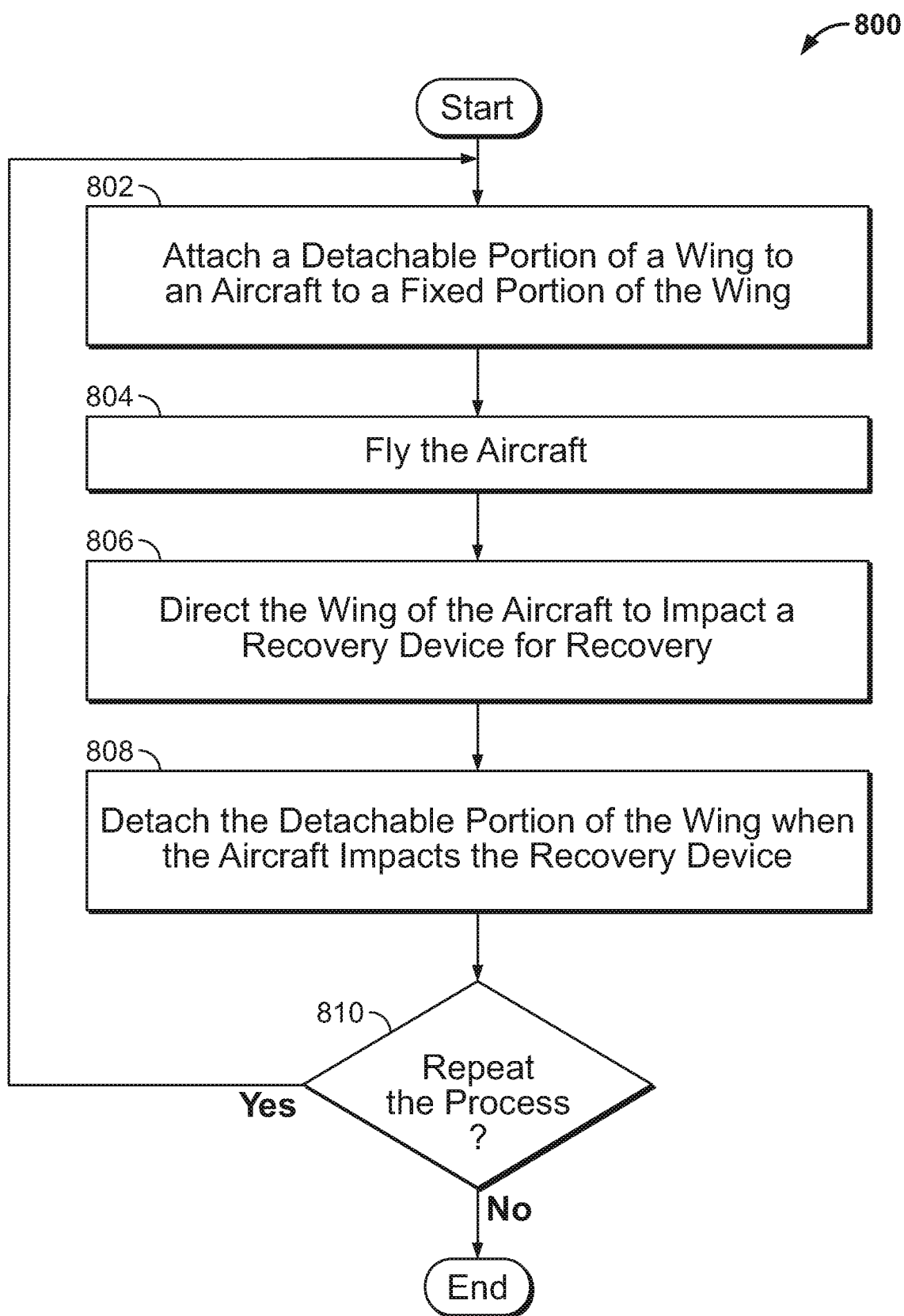
FIG. 8 is a flowchart of an example method to implement examples disclosed herein.

FIG. 8 is a flowchart representative of an example method 800 to implement examples disclosed herein. The example method 800 begins as an aircraft such as the UAV 100, is to be flown and recovered without use of a landing gear.

At block 802, the detachable portion 204 is attached to the wing 110. In particular, the detachable portion 204 is coupled to the fixed portion 202 via the lock 206. In this example, the guide 212 is used to align the detachable portion 204 relative to the fixed portion 202 during this coupling.

The aircraft is flown (block 804). In this example, the aircraft is flown in an automated navigational process.

The wing 110 of the aircraft is then directed toward a recovery device, such as the recovery line 122, to recover the aircraft (block 806).

Next, the detachable portion 204 is detached from the fixed portion 202 when the aircraft impacts the recovery line 122 (block 808). In particular, the hook 114 of the wing 110 contacts the recovery line 122 to disengage the lock 206 in this example. Additionally, the tether 214 elastically stretches during the separation of the fixed portion 202 and the detachable portion 204 of the wing 110.

It is then determined whether to repeat the process (block 810). If the process is to be repeated (block 810), control of the process returns to block 802. Otherwise, the process ends. This determination can be based on whether the aircraft is to be flown again.

From the foregoing, it will be appreciated that example methods, apparatus and articles of manufacture have been disclosed that reduce and/or eliminate damage to an aircraft or vehicle during recovery (e.g., landing without a landing gear) by utilizing a wing and/or portion of the wing that is detachable from a fixed portion such that the load path is aligned with the load vector to more easily handle the impact of the wing with a recovery device. As a result, structural reinforcements, which can involve significant costs and additional weight, are not necessitated for recovery.

Example 1 includes an apparatus that includes a detachable portion of a wing that is couplable to a fixed portion of the wing, a lock configured to fasten the detachable portion to the fixed portion, where the lock is configured to disengage the detachable portion from the fixed portion upon contact of the wing with a recovery device, and a tether configured to extend between the detachable and fixed portions.

Example 2 includes the apparatus of Example 1, and further includes a guide configured to guide a relative alignment of the detachable portion to the fixed portion when the detachable portion is coupled to the fixed portion.

Example 3 includes the apparatus of Example 2, where the guide functions as a structural member of the wing to transfer flight loads from the fixed portion to the detachable portion.

Example 4 includes the apparatus of Example 2, where the guide is located on one of the detachable or fixed portions and has a trapezoidal shape to be received by a corresponding aperture of the other one of the detachable or fixed portions.

Example 5 includes the apparatus of Example 2, where the tether is contained within a cavity of the guide when the detachable and fixed portions are coupled.

Example 6 includes the apparatus of Example 1, where the lock includes a pin.

Example 7 includes the apparatus of Example 1, where the lock includes a coil spring of one of the detachable or fixed portions, and where the coil spring is configured to be received by a curved annular surface of the other one of the detachable or fixed portions.

Example 8 includes the apparatus of Example 1, where the tether includes an elastic cable.

Example 9 includes an aircraft having a wing having a detachable portion couplable to a fixed portion, and a lock configured to couple the detachable portion and the fixed portion, where the lock is configured to enable the detachable portion to disengage from the fixed portion when the wing contacts a recovery device, and a tether configured to extend between the detachable portion and the fixed portion.

Example 10 includes the aircraft of Example 9, and further includes a guide configured to guide a position of the detachable portion relative to the fixed portion when the detachable portion is coupled to the fixed portion.

Example 11 includes the aircraft of Example 10, where the tether is contained within a cavity of the guide when the detachable and fixed portions are coupled.

Example 12 includes the aircraft of Example 9, where an end of the fixed portion is located at a fuselage of the aircraft.

Example 13 includes the aircraft of Example 9, where the lock includes a pin to be disposed in a barrel nut.

Example 14 includes the aircraft of Example 9, where the lock includes a coil spring of one of the detachable or fixed portions configured to be received by a curved annular surface of the other one of the detachable or fixed portions.

Example 15 includes a method with directing a detachable portion of a wing of an aircraft toward a recovery device, and separating the detachable portion from a fixed portion of the wing upon contact of the wing with the recovery device, where a tether extends between the detachable portion and the fixed portion.

Example 16 includes the method of Example 15, and further includes coupling the detachable portion to the fixed portion via a lock.

Example 17 includes the method of Example 16, where the lock is frangible.

Example 18 includes the method of Example 15, where separating the detachable portion from the fixed portion includes breaking a pin disposed in a barrel nut.

Example 19 includes the method of Example 15, where separating the detachable portion from the fixed portion includes separating a coil spring of one of the detachable or fixed portions from a curved annular surface of the other one of the detachable or fixed portions.

Example 20 includes the method of Example 15, where directing the detachable portion of the wing of the aircraft toward the recovery device includes directing a distal end of the detachable portion toward the recovery device.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While the examples disclosed herein are described in relationship to aircraft and/or UAVs, examples disclosed herein can be implemented with any appropriate recovery applications.

What is claimed is:

1. An apparatus comprising:
a detachable portion of a wing that is couplable to a fixed portion of the wing, wherein the detachable portion defines a distal end of the wing when the detachable and fixed portions are coupled;
a lock configured to fasten the detachable portion to the fixed portion, wherein the lock is configured to disengage the detachable portion from the fixed portion upon contact of the wing with a recovery device; and
a tether configured to extend between the detachable and fixed portions.

2. The apparatus as defined in claim 1, further including a guide configured to guide a relative alignment of the detachable portion to the fixed portion when the detachable portion is coupled to the fixed portion.

3. An apparatus as defined in claim 2, wherein the guide functions as a structural member of the wing to transfer flight loads from the fixed portion to the detachable portion.

4. The apparatus as defined in claim 2, wherein the guide is located on one of the detachable or fixed portions and has a trapezoidal shape to be received by a corresponding aperture of the other one of the detachable or fixed portions.

5. The apparatus as defined in claim 2, wherein the tether is contained within a cavity of the guide when the detachable and fixed portions are coupled.

6. The apparatus as defined in claim 1, wherein the tether includes an elastic cable.

7. An apparatus comprising:
a detachable portion of a wing that is couplable to a fixed portion of the wing;
a lock configured to fasten the detachable portion to the fixed portion, wherein the lock is configured to disengage the detachable portion from the fixed portion upon contact of the wing with a recovery device, and wherein the lock includes a pin; and
a tether configured to extend between the detachable and fixed portions.

8. An apparatus comprising:
a detachable portion of a wing that is couplable to a fixed portion of the wing;
a lock configured to fasten the detachable portion to the fixed portion, wherein the lock is configured to disengage the detachable portion from the fixed portion upon contact of the wing with a recovery device, and wherein the lock includes a coil spring of one of the detachable or fixed portions, and wherein the coil spring is configured to be received by a curved annular surface of the other one of the detachable or fixed portions; and
a tether configured to extend between the detachable and fixed portions.

9. An aircraft comprising:
a wing having a detachable portion couplable to a fixed portion;
a lock configured to couple the detachable portion and the fixed portion, wherein the lock is configured to enable the detachable portion to disengage from the fixed portion when the wing contacts a recovery device; and
a tether configured to extend between the detachable portion and the fixed portion.

10. The aircraft as defined in claim 9, further including a guide configured to guide a position of the detachable portion relative to the fixed portion when the detachable portion is coupled to the fixed portion.

11. The aircraft as defined in claim 10, wherein the tether is contained within a cavity of the guide when the detachable and fixed portions are coupled.

12. The aircraft as defined in claim 9, wherein an end of the fixed portion is located at a fuselage of the aircraft.

13. The aircraft as defined in claim 9, wherein the lock includes a pin to be disposed in a barrel nut.

14. The aircraft as defined in claim 9, wherein the lock includes a coil spring of one of the detachable or fixed portions configured to be received by a curved annular surface of the other one of the detachable or fixed portions.

15. A method comprising:
directing a detachable portion of a wing of an aircraft toward a recovery device; and
separating the detachable portion from a fixed portion of the wing upon contact of the wing with the recovery device, wherein a tether extends between the detachable portion and the fixed portion.

16. The method as defined in claim 15, further including coupling the detachable portion to the fixed portion via a lock.

17. The method as defined in claim 16, wherein the lock is frangible.

18. The method as defined in claim 15, wherein separating the detachable portion from the fixed portion includes breaking a pin disposed in a barrel nut.

19. The method as defined in claim 15, wherein separating the detachable portion from the fixed portion includes separating a coil spring of one of the detachable or fixed portions from a curved annular surface of the other one of the detachable or fixed portions.

20. The method as defined in claim 15, wherein directing the detachable portion of the wing of the aircraft toward the recovery device includes directing a distal end of the detachable portion toward the recovery device.

* * * * *